United States Patent [19]

Marc

[11] 4,424,936
[45] Jan. 10, 1984

[54] DRIP-IRRIGATION EMITTER FOR MOUNTING ON A LIQUID SUPPLY-CONDUIT

[76] Inventor: Dumont Marc, 4 place de l'Aigoual, 31770 Colomiers, France

[21] Appl. No.: 349,854

[22] Filed: Feb. 18, 1982

[30] Foreign Application Priority Data

Feb. 26, 1981 [FR] France .................. 81 04071

[51] Int. Cl.³ .............................. B05B 15/06
[52] U.S. Cl. ................... 239/271; 138/45; 239/542
[58] Field of Search ........... 239/542, 547, 271, 533.1, 239/570, 590.3, 272; 138/44, 45

[56] References Cited

U.S. PATENT DOCUMENTS

| | | | |
|---|---|---|---|
| 3,409,050 | 11/1968 | Weese | 138/45 |
| 3,474,831 | 10/1969 | Noakes | 138/45 |
| 3,630,455 | 12/1971 | Parkison | 239/570 |
| 4,058,257 | 11/1977 | Spencer | 239/542 |
| 4,369,923 | 1/1983 | Bron | 239/542 |
| 4,382,549 | 5/1983 | Christy et al. | 239/542 |

FOREIGN PATENT DOCUMENTS 2018113 10/1979 United Kingdom ............ 239/542

Primary Examiner—John J. Love
Assistant Examiner—Michael J. Forman
Attorney, Agent, or Firm—Shlesinger, Arkwright, Garvey & Fado

[57] ABSTRACT

The invention concerns a drip irrigation emitter for mounting on a liquid supply conduit perforated with a suitable orifice.

The emitter is of the type comprising a body (1) with an inside cavity and an elastic membrane (2) dividing the body inside chamber into two compartments, one an upstream compartment (5) and the other a downstream compartment (7) with intake and discharge apertures (6) and (8), respectively. The emitter of the invention is characterized in that the downstream compartment (7) is bounded by a converging, in particular a frustrom-of-cone wall (9) comprising at least one flow channel (10) extended at the membrane by a duct (11) issuing into the upstream compartment (5). Regulation is achieved by covering a variable length of the channel (10).

12 Claims, 10 Drawing Figures

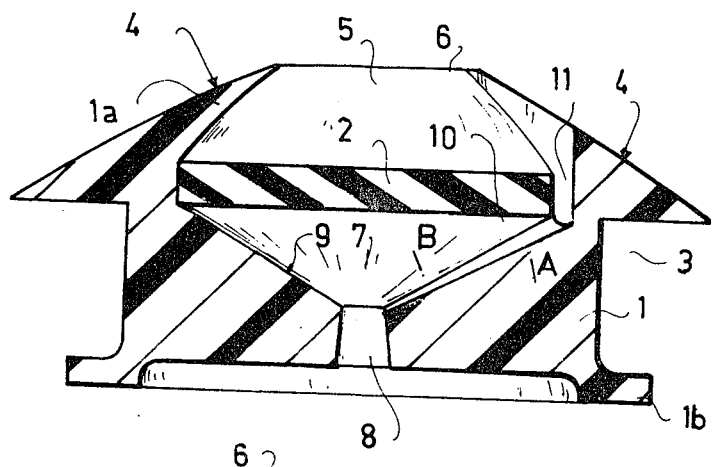
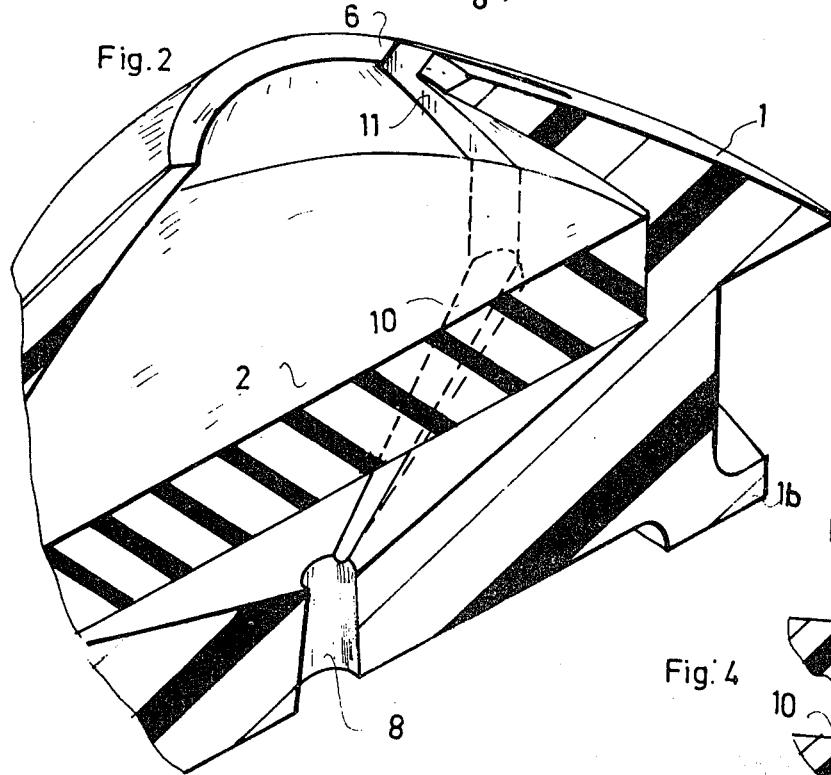
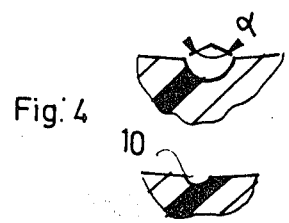

DRIP-IRRIGATION EMITTER FOR MOUNTING ON A LIQUID SUPPLY-CONDUIT

The invention concerns a irrigation emitter making it possible, in particular in agriculture, to provide drip sprinkling from a liquid supply conduit.

It is known that drip-sprinkling offers many advantages in agriculture and in particular substantial economies in water and energy. This sprinkling generally is carried out by providing a conduit with a plurality of irrigation emitters corresponding to the points to be sprinkled.

At the present time several irrigation emitter types are known which allow regulating the rate of flow of water delivered regardless of the location of the emitter along the conduit (i.e., the liquid pressure at the emitter). One type of emitters offering significant results is described in particular in the Canadian patent No. 921,361 or in the French patent No. 73.37765 published as #2,334,422. The emitters of this type are provided with a flexible membrane perforated by a calibrated hole at its center and capable of deforming under pressure. These membranes are designed in such a manner that their central hole presents a cross-section which is a decreasing function of the size of their deformations. When the pressure increases, the cross-section of this hole decreases, assuring thereby the desired regulation of the liquid flow rate.

However this type of feed presents certain defects. In the first place such emitters strongly tend to clog and frequently are rendered inoperative due to the sealing or clogging by particles contained in the fed liquid, the particles penetrating and incrustating on the calibrated hole of the membrane. In such a case it is necessary to manually clean the emitter to eliminate the obstructing particles.

Moreover, for a given emitter of this type, the range of pressures which can be used is relatively narrow. For instance an emitter designed to operate at a pressure of roughly 0.5 kg/cm$^2$ will be incapable of providing satisfactory regulation at a pressure ten times higher.

Furthermore, it is difficult to precisely calibrate the membrane holes during the manufacture of these membranes. This is because they are made by molding a flexible material of the elastomer type (silicone or other) and the keeping of the central hole can be achieved only at relatively large tolerances.

Again, other types of emitters have been proposed. For instance emitters have been suggested in the French patent No. 2,421,677 or in the U.S. Pat. No. 4,022,893 or in the German patent No. 2,829,013 wherein the regulation is achieved by a more or less pronounced crushing of the elastic material of a membrane.

In the French patent No. 2,421,677, a channel is hollowed out of the membrane and the flow cross-section of this channel is reduced on account of the squashing of the membrane against a wall. The membrane is kept in place by some of its edges to operate as a valve which can deform abruptly when the pressure exceeds a given threshold. The regulation takes place, then, if the pressure increases from this threshold by the fact of crushing the elastic material. However such a solution suffers from the drawback of requiring special membranes which are very costly to manufacture and which are difficult to miniaturize. Also, the regulation takes place only at average or high pressure levels (of the order of 1 to 5 bars providing complete support of the membrane against the wall). Lastly the crushing principle entails a fairly inaccurate regulation.

In the U.S. Pat. No. 4,011,893, the groove is fashioned on a plane support wall and the regulation is obtained by crushing the membrane, whereby the elastic material enters the groove to a greater or lesser extent. While the membrane used thusly may be simpler, no self-cleaning effect is obtained, the emitter being on the contrary quite subjected to clogging. Again, the defect of a lack of precise regulation is ever present in view of the crushing principle.

The German patent No. 2,829,013 describes an emitter of the same type as the preceding one but wherein the membrane in addition is free to translate to provide a certain self-cleaning effect. While the defect in lack of regulation accuracy remains, the freedom of the membrane to move may also entail operational malfunction, in particular by jamming large particles. It should also be noted that the self-cleaning effect obtained is mediocre because the groove is open toward the incoming water flow and therefore is not subjected to a drag-effect on the particles when the membrane is detached. Also, the membrane is provided with a calibrated hole whereby its manufacture is rendered complex and leads to the difficulties already stated.

Lastly, all the feed means cited above are relatively bulky devices which constitute substantial projections on the outsides of the conduits to which they are mounted. Under these conditions, these conduits can never be handled by mechanical means or else the feeds might be torn off. This is a serious drawback in practice for enterprises of a certain scale where great lengths of conduits must be handled, as manual handling is time-consuming and difficult.

It is the object of the present invention to create an improved irrigation emitter capable of regulating the flow rate of the delivered liquid in the absence of the defects cited above.

One object in particular of the invention is to provide a self-cleaning emitter inherently providing the automatic elimination of particles likely otherwise to clog.

Another object is to substantially extend the range of pressure within which the emitter can be operated satisfactorily.

Another object is to simplify the membrane manufacture by eliminating the difficulties in making calibrated holes within the membranes or the difficulties attending the manufacture of special membranes.

Another object of the invention is to provide an emitter which can easily be miniaturized in order that the local projections outside the conduits on which such emitters are mounted may be much reduced and for the purpose of allowing these conduits to be handled by mechanical means without the risk of tearing off the emitters.

Another object is to provide an irrigation emitter which is self-filtering.

To that end, the irrigation emitter of the invention is of the type which comprises:

(1) a body with an inside cavity bounding an internal chamber open on either side of this body in the form of liquid intake and discharge apertures, this body being provided on the outside and at its periphery with means to fix it to the liquid supply conduit which is provided with a suitable orifice, and (2) and an elastic membrane located in the body's internal chamber so as to divide it into two compartments, one downstream wherein issue respectively the liquid intake and discharge apertures. The irrigation emitter of the present invention is characterized in that:

(a) the downstream compartment is bounded by a body wall converging from the membrane rims to the discharge aperture and arranged to act as a progressive support for the membrane when it is being deformed, (b) the membrane is in the form of a solid disk made from an elastic material hermetically separating over its entire area the upstream compartment from the downstream compartment, said membrane being so kept in place at its periphery that it can progressively deform under the influence of a growing pressure between two end states, one being the membrane at rest and totally detached from the converging wall, the other being the membrane resting substantially over its entire area against the surface of said converging wall;

(c) said convergent wall is provided with at least one flow channel opening in the downstream compartment and extending from the membrane rim toward the liquid discharge aperture so that said channel will be covered by the elastic membrane over a variable length depending on the membrane deformation, from a zero covered length when in the first end state where the membrane is detached from the convergent wall to a maximum covered length corresponding to the other end state where the membrane rests against the entire area of said convergent wall; and (d) each above cited flow channel is extended at the membrane by a duct in the body issuing into this body's upstream compartment.

Thus as regards the emitter of the invention, the liquid flows not through a hole in the membrane but through a lateral channel in the body wall. As will be more clearly understood further below, the membrane by deforming under the pressure comes to rest against this wall over an area which depends on the pressure and therefore covers the channel in variable manner depending on the pressure. In this way, the loss in head caused by the channel is an increasing function of pressure, thereby achieving the regulation of the liquid flow rate. This regulation therefore is achieved by varying the length of the groove covered by the membrane (not by crushing the material), whereby excellent accuracy is obtained.

Moreover, the membrane is guided by the wall of the body (which in particular may be conical) and the effective surface of said body decreases as the pressure increases. In this manner it is possible to regulate the flow rate over a much wider pressure range.

Again, the membrane—which can be molded or cut to size from an elastomer in conventional manner, using for instance a silicone or analogous type, lacks any calibrated hole and may consist of a mere elastic disk. Its manufacture is substantially simpler than that of the conventional membranes and its dimensions may be made much smaller as regards miniaturizing the feed means.

The above cited flow channel for instance can substantially assume the shape determined by a generatrix of the body's convergent wall. In that case the cross-section of the flow channel advantageously is made to decrease from the rim of the membrane toward the discharge aperture. In this manner the orifice of the channel, through the flow takes place presents a cross-section which decreases as the pressure increases and the variation in the loss of head is essentially caused in this instance by the variation of this orifice's cross-section.

In another characteristic which may be combined with the previous one, the flow channel may follow a longer path extending helically on the convergent wall of the body. The variation in the loss of head then is caused at least in part by the more or less substantial length of channel covered by the membrane. As will be more clearly understood further below, a self-cleaning effect is assured whenever the membrane resumes its rest position, as in that case the flow channel is open along its entire length, as a consequence of which any clogged particles in said groove will be freed. These particles are eliminated by entrainment at the beginning and the end of each watering period when the water flows at a lesser pressure (the water flow sweeping the groove in the direction favoring this elimination).

Other characteristics, purposes and advantages of the invention will become clear in relation to the description below and the attached drawings which illustrate the invention and show one embodiment of same; these drawings are an integral part of the present description:

FIG. 1 is an axial cross-section on an enlarged scale of an irrigation emitter of the present invention, FIG. 2 is a partial schematic prespective in front section;

FIGS. 3 and 4 are partial detailed sections through planes A and B, respectively, of FIG. 1;

Figure 5:
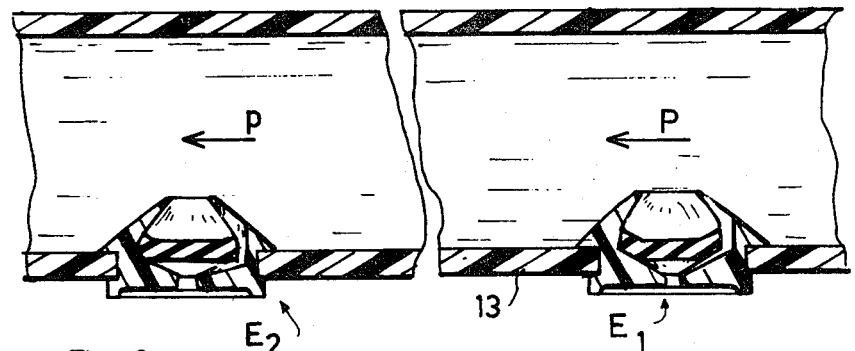
FIG. 5 is a schematic view of emitters of the invention mounted on a water supply conduit.

The irrigation emitter illustratively shown in FIGS. 1, 2, 3 and 4 consists of two pieces: a body 1 and an elastic membrane 2.

The body 1 is an integral piece made by injection molding a plastic, in particular a high-density polyethylene. It assumes a generally cylindrical shape and is provided with a cavity inside of it which bounds a chamber wherein is located the membrane 2. This membrane divides this chamber into two compartments: an upstream compartment 5 issuing outside the body by a liquid intake aperture 6 and a downstream compartment 7 which issues by a liquid discharge orifice 8.

Furthermore, the body 1 is provided on the outside with a peripheral hollow 3 and with a conical part 4 to force-fit it into an orifice of suitable dimensions fashioned in a water supply conduit.

The hollow 3 is arranged around that part of the body which contains the membrane, preferably on the outside of the body so that the part 1b of it which projects externally with respect to the hollow be of slight thickness.

The body 1 is manufactured so that its first compartment 5 is cylindrical, then the membrane is inserted into this compartment and the rim 1a is crimped to keep the membrane 2 in place and to bound the intake aperture 6.

The downstream compartment 7 is bounded by a substantially frustoconical wall 9 converging from the membrane 2 toward the discharge aperture 8. This wall subtends an angle preferably between about 90° and 140°, in particular roughly 120°.

Moreover, the wall 9 comprises a flow channel 10 located along a generatrix and of a cross-section which decreases from the rim of the membrane 2 toward the discharge aperture 8.

As shown by the detailed sections of FIGS. 3 and 4, the channel 10 presents over its entire length a cross-section which opens without an undercut toward the downstream compartment 7 so as to eliminate any risk of wedging a particle in said channel when the membrane 2 is at rest (zero or low pressure).

In this example, the channel 10 has a cross-section of an arc of circle of at most 180° (in particular about 170°).

The flow channel 10 is extended near the membrane 2 by a duct 11 which in this example is a groove in the body near said membrane. This groove 11 issues into the upstream compartment 5 and the outside of the body to provide a passageway to the liquid. The cross-section of this duct 11 is made at least equal to the maximum cross-section of the flow channel 10 (at the membrane 2). Preferably this cross-section of the duct 11 is made substantially larger than that of the channel 10 so as to practically eliminate the risks of clogging said duct.

The elastic membrane 2 is made in the manner of a solid cylindrical disk, in particular one with parallel sides, obtained by molding or cutting from silicone, and its elastic properties allow it to deform under pressure to come to rest against the wall 9 between two end positions, one of which corresponds to the rest position (wholly free membrane: zero or very low pressure), the other corresponding to being applied against the entire wall 9 as far as the rim of the discharge aperture 8 (high pressure).

The elastic properties of the membranes are designed in correlation with the conical angle of the wall 9 so that the two above-cited end positions are obtained for extreme pressure values corresponding to the desired operational range of the emitter. This range may be quite wide and extend from a very low pressure (roughly 0.05 kg/cm$^2$, below which the membrane deformations are negligible) to a high value exceeding 5 kg/cm$^2$. Regulation is achieved over this entire range thanks to the flow channel 10 which is covered over a variable length and hence offers a passageway cross-section which can be adjusted perfectly well depending on the desired regulation.

The cross-section of this channel 10 for instance may vary between about 1 to 3 mm$^2$ (maximum cross-section at the membrane) and 0.01 to 0.1 mm$^2$ (minimum cross-section at the discharge aperture).

For pressures within the range above, these values offer a regulated flow rate of the order of 1 to 6 liters/h.

It should be noted that the body 1 where appropriate can be provided with different membrane types without thereby affecting the manufacture of the body itself. The adjustment of the membrane thickness and of their modulus of elasticity if called for makes it possible to further widen the range of the pressures as needed without thereby appreciably raising production costs.

FIG. 5 shows emitters $E_1$ and $E_2$ of the invention, force-fitted into orifices in a water pipe 13. Once set, the body 1 of the emitter projects beyond the outside of the conduit only very little. Such an arrangement combined with the feasibility of miniaturizing the membranes (and hence the body size) makes it possible to manufacture drip watering conduits that can be handled mechanically as if they were smooth conduits, without the risk of tearing off the emitter. As an illustration, it is quite easy to make emitter of the invention of which the surface part is ten times less in cross-section than that of the conduits on which they are mounted: conduits equipped with such emitter are similar to smooth conduits.

Figure 8:
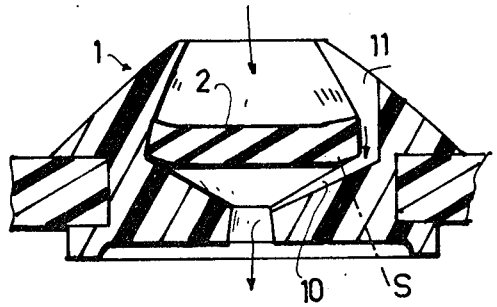
FIGS. 7 and 8 are sections illustrating the operation of the emitter.
Figure 7:
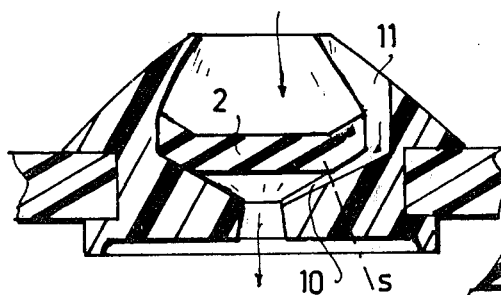

The emitter $E_1$ located upstream on the side of the water supply is subjected to a higher pressure P than the downstream emitter $E_1$ (pressure p) and its membrane is deformed more so that the flow cross-section is less for the emitter $E_1$, namely s, than for the emitter $E_2$, namely S. These cross-sections may be designed to achieve the desired regulation, in particular of equal flow rates d for the two emitters ($d=ksP=kSp$). The FIG. 7 and 8 are on a larger scale and show the emitters $E_1$ and $E_2$ with their respective flow cross-sections s and S.

Figure 6:
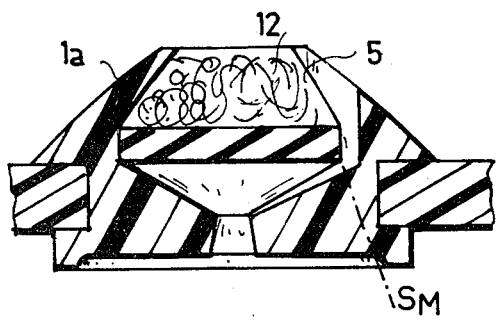
FIG. 6 is a schematic section of an emitter at rest and provided with a fiber filtering material.

The FIG. 6 shows an emitter at rest in the upstream compartment 5 wherein filter means 12 have been emplaced prior to crimping the rims 1a. In this example, the filter consists of a fiber material preferably of long fibers which are self-stabilized within the compartment 5 without the risk of being dragged along. This fiber material provides filtering of the liquid arriving in the body and keeps back part of the particles.

Figures 9, 10:
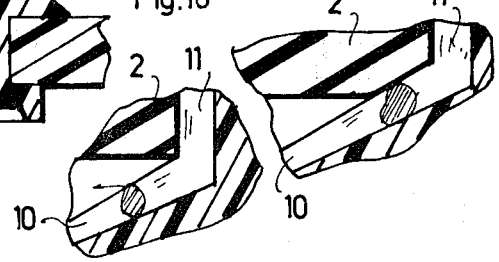
FIGS. 9 and 10 are detailed sections showing the emitter's self-cleaning effect.

Some of the particles pass through the barrier of the fiber material 12 and may clog at the flow section of the channel 10 as indicated in FIG. 9. However, at the end of sprinkling, these particles are released when the membrane 2 resumes its rest position as indicated in FIG. 10. The drop in pressure at the end of sprinkling and the immersion in water of the emitter at the beginning of a new period of sprinkling then determine an entrainment of the particle which thereby is eliminated. Such a self-cleaning effect therefore eliminates the need for a manual cleaning of the emitters.

For instance, the conical wall 9 may comprise several flow channels 10 distributed over it and each associated with a duct 11 for passing the liquid.

It should also be noted that at the discharge of the channel(s) 10, the light jet is sloping with respect to the discharge aperture 8 and breaks against the walls bounding this aperture, whereby it is possible to provide direct sprinkling by this aperture without having to add specific means to the emitter to achieve this function.

Where appropriate, this discharge aperture may be provided on the external side with either a projecting small nozzle for branching to it a capillary flow tube or a short flexible protective sleeve. Moreover, the body 1 manifestly can be made of several pieces during the assembly of which a filter element would be added.

While this invention has been described as having a preferred design, it will be understood that it is capable of further modification. This application is, therefore, intended to cover any variations, uses, or adaptations of the invention following the general principles thereof and including such departures from the present disclosure as come within known or customary practice in the art to which this invention pertains, and as may be applied to the essential features hereinbefore set forth and fall within the scope of this invention or the limits of the claims.

I claim:

1. A drip-irrigation emitter for mounting on a liquid supply conduit perforated with a suitable orifice, said emitter comprising:

a body (1) having an inside chamber opening to either side of said body through a liquid intake aperture (6) and a liquid discharge aperture (8), said body (1) being externally provided at its periphery with means (3,4) for fixing said body to said conduit, an elastic membrane (2) having a peripheral rim positioned within said chamber so as to divide it into upstream and downstream compartments (5, 7) from which issue respectively said intake aperture (6) and said discharge aperture (8), said downstream compartment (7) being bounded by a wall (9) of said body converging from the rim of said membrane (2) toward the discharge aperture (8) and designed to act as a progressive support for the membrane during deformations, said membrane being in the shape of a solid disk of elastic material and separating over its entire area said upstream compartment (5) from said downstream compartment (7), said membrane being kept in place throughout its periphery in such a manner that it may deform progressively under an increasing pressure in said conduit between first and second positions, said first position being that of said membrane at rest wholly detached from the converging wall (9), the second position being that wherein said membrane rests substantially against the entire surface of said convergent wall (9), said convergent wall (9) containing at least one flow channel (10) issuing in the downstream compartment (7) and extending from the rim of said membrane (2) toward said liquid discharge aperture (8) whereby said channel (10) is covered by the elastic membrane (2) over a variable length depending on its deformation, from zero length covered for said first position in which the membrane is separated from said convergent wall (9) to a maximum covered length corresponding to said second position wherein the membrane rests against the entire surface of said convergent wall (9), said at least one flow channel (10) connecting at said membrane (2) to a duct (11) in said body (1) and issuing into its upstream compartment (5).

2. An irrigation emitter as in claim 1, wherein said at least one flow channel (10) in said convergent wall (9) is of a decreasing cross-section from the rim of the membrane (2) toward the discharge aperture (8).

3. An irrigation emitter as in claim 2, characterized in that said convergent wall (9) is substantially frustoconical.

4. An irrigation emitter as in claim 3, characterized in that said convergent wall (9) assumes a substantially frustoconical shape subtending an angle between 90° and 140°.

5. An irrigation emitter as in claim 1, 2, 3 or 4, characterized in that said at least one flow channel (10) evinces over its entire length a cross-section issuing into the downstream compartment (7).

6. An irrigation emitter as in claim 5, wherein said at least one flow channel (10) in said convergent wall (9) has a cross-section of an arc-of-circle of an angle of at most 180°.

7. An irrigation emitter as in claim 2 wherein said at least one flow channel (10) in said convergent wall (9) evinces a cross-sectional area varying approximately from 1 to 3 mm$^2$ at said membrane (2) to 0.01 to 0.1 mm$^2$ at said discharge aperture (8).

8. An irrigation emitter as in claim 1, 2, 3, 4 or 7, and wherein said at least one flow channel (10) extends substantially along a generatrix of said convergent wall (9).

9. An irrigation emitter as in claim 1, 2, 3, 4 or 7, and wherein said duct (11) comprises a groove in the body (1) at the rim of the membrane (2) opening into said upstream compartment (5), the cross-section of said duct (11) being at least equal to the maximum cross-section of the channel (10).

10. An irrigation emitter as in claim 1, 2, 3, 4 or 7, and including filter means (12) arranged within said upstream compartment (5).

11. An irrigation emitter as in above claim 1, 2, 3, 4 or 7, and wherein said body (1) includes an external peripheral hollow (3) and an external conical part (4) to allow force-fitting said body into the conduit orifice, the liquid feed being characterized in that the hollow (3) is located around that part of the body which holds the elastic membrane (2) whereby, once forced into the conduit orifice, the body shall only project by a slight thickness beyond the outside of the said conduit.

12. An irrigation emitter as in claim 1, 2, 3, 4 or 7, and wherein said body (1) is made integrally of a plastic, and said membrane (2) is kept in place inside said body by crimped edges (1a) bounding said liquid intake aperture (6).

* * * * *